Apr. 17, 1923.
J. F. WAIT
1,452,009
PROCESS FOR UTILIZATION OF AMMONIA
Filed May 25, 1920          2 Sheets-Sheet 2
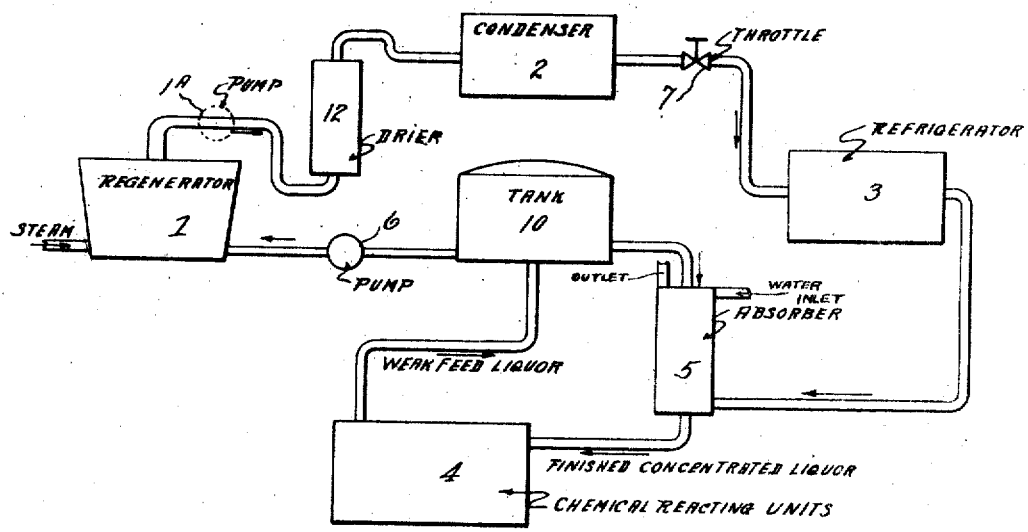

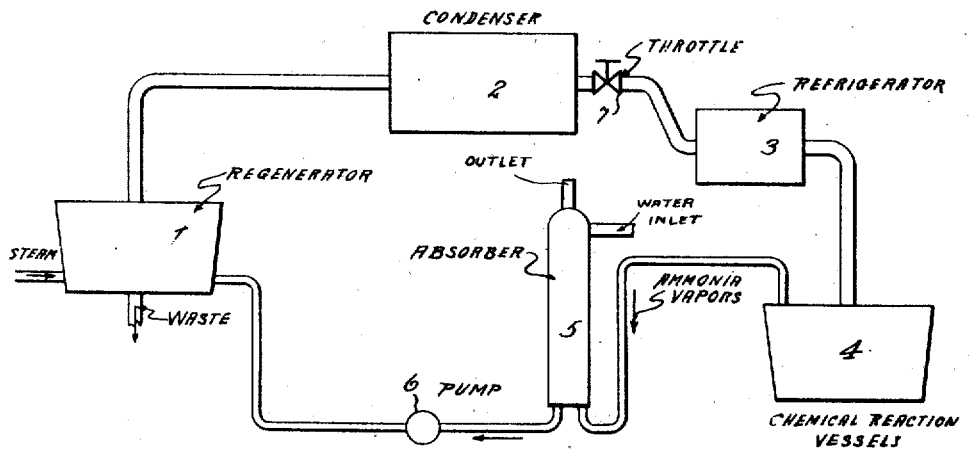
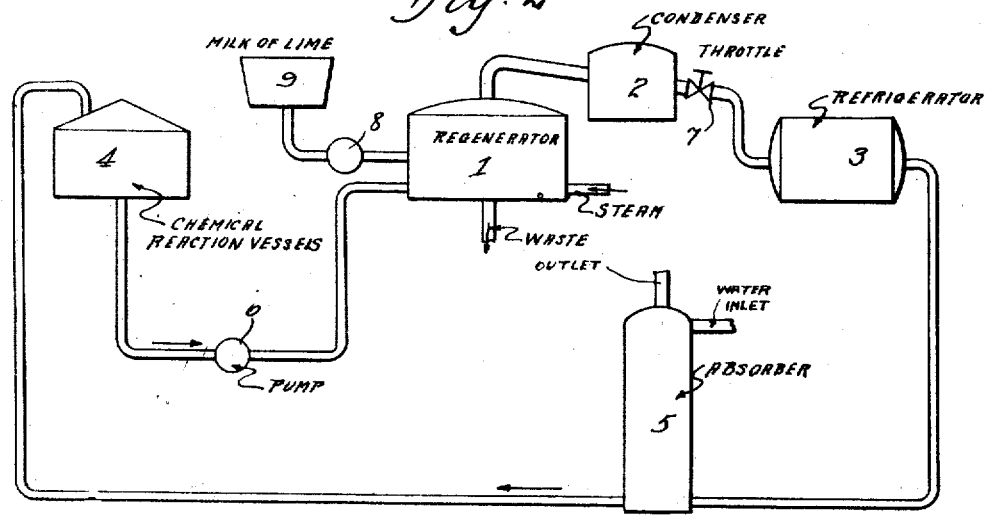

Patented Apr. 17, 1923.

1,452,009

UNITED STATES PATENT OFFICE.

JUSTIN F. WAIT, OF NEW YORK, N. Y.

PROCESS FOR UTILIZATION OF AMMONIA.

Application filed May 25, 1920. Serial No. 384,097.

*To all whom it may concern:*

Be it known that JUSTIN F. WAIT, citizen of the United States, residing at New York city, in the county of New York and State of New York, has invented certain new and useful Improvements in Processes for Utilization of Ammonia, of which the following is a specification.

In chemical processes it is frequently necessary to recover ammonia gas in order to effect chemical economy. One way of accomplishing this is in the well known manner of absorbing the ammonia gas in water and subsequently regenerating the ammonia by heating the aqueous ammonia thus formed either with direct or indirect steam.

The heat drives off the ammonia gas with some water vapors, which are condensed, forming aqueous ammonia. Normally this regeneration of the ammonia is carried out under approximately atmospheric pressure.

The amount of heat necessary for the regeneration of the ammonia gas in the manner described is considerable. It requires but a small percentage increase in heat to regenerate this ammonia gas under pressure such that cooling by means of water obtainable from usual sources will liquefy the ammonia.

This liquefication may also be accomplished by mechanical means of obtaining the pressure such as passing the vapors from the regenerators through a compressor. In such a case it might be advisable to cool the gases before compression as well as after compression.

After the ammonia is thus liquefied it is passed into a system of lower pressure in which the liquefied ammonia is allowed to evaporate, thus creating a refrigerating effect similar in effect to an ordinary refrigerating machine.

The gases after evaporation are used directly in the gaseous form, or reabsorbed yielding a pure aqueous solution which will again be used in the chemical process. In this manner a process requiring the expenditure of energy as heat, may be controlled so as to convert this energy, which would otherwise be wasted, into a useful form. In order to accomplish this control there is required a relatively small amount of additional energy.

In some processes, ammonia is recovered as fixed ammonia. In such an instance the ammonia is combined chemically with some other element or elements. Ammonia as such may be recovered from this ammonia compound by heating with suitable reagent. An example of this is the recovery of ammonia chloride in the acid hydrolysis of some organic nitrite.

The "fixed" ammonia, as the chloride in the example cited, may be released as free or unattached ammonia by heating with milk of lime. This is in accordance with standard practice.

The heating converts the fixed ammonia into free ammonia and distils off the newly formed free ammonia together with such other free ammonia as may have been present in the mixture.

As in the case before mentioned, considerable energy is expended in driving off the ammonia. With a slight increase in the amount of energy the cycle may be so controlled as to convert the energy thus expended into a useful form yielding a refrigerating effect.

In a like manner it frequently happens that a chemical process consumes a quantity of ammonia, part of which is released again in the form of a dilute aqueous solution, of little value, as such. This dilute aqueous ammonia may be concentrated and passed back into the system thus forming a closed cycle and effecting high ammonia economy.

If this concentration is controlled and a small amount of additional energy expended, a conversion of the energy from a wasteful to a useful form may be accomplished. In this case it is advisable to control the process so as to yield nearly anhydrous ammonia for the refrigerating effect and to reabsorb this in some of the dilute aqueous ammonia in order to produce the strength desired.

In systems operating in this manner it is desirable to have a low moisture content in the ammonia after it is driven out of solution by the heat. For this purpose the usual dephlegmators, columns, etc., would be used but in addition to this a drying column is placed in the system prior to the cooling or condensing units. This drying column consists of a tower or its equivalent filled with lime or other suitable dehydrating agent.

In the accompanying drawings Figs. 1, 2, and 3 are diagrams illustrating the process and modifications thereof.

Fig. 1 shows a chemical process absorbing ammonia vapors at one period or step and regenerating ammonia vapors at another period or step. It is assumed that this absorbing and regenerating is carried out in a group of known chemical reaction units represented at 4. The vapor resulting from the reaction is absorbed in a tower, or its equivalent, represented by 5. The ammonia solution is then pumped into a system of high pressure by means of a pump 6. This solution passes into a regenerator shown at 1 in the figure. Here it is heated, as by means of steam, and ammonia vapors are driven off, the pressure still being in excess of the pressure at tower 5, and of such degree that the vapors on passing into a condenser 2 will be condensed by such cooling water as is available under normal operating conditions.

The liquefied ammonia is passed through a throttle valve 7 and into a refrigerator 3 in which it is allowed to evaporate due to the absorption of heat from the medium which it is desired should be refrigerated. The ammonia, now in vapor form, is passed into the chemical reacting vessels 4 where it enters into reaction, thus completing the cycle. It will be understood that the reaction in these vessels is such as to finally deliver ammonia vapor as referred to in the start.

Fig. 2 shows a chemical process in which fixed ammonia is produced, the ammonia being recovered again as free ammonia by passing through the described cycle producing a useful refrigerating effect.

The fixed ammonia is delivered in solution from the chemical reaction vessels 4 to the pump 6 by which it is pumped into the regenerator 1 maintained under pressure such that the ammonia arising therefrom may be liquefied by ordinary cooling water in the condenser 2 maintained at approximately the same pressure as the discharge line from regenerator 1.

The fixed ammonia is freed by heating with some reagent such as milk of lime which is pumped from supply 9 into regenerator 1 by means of a pump 8. After condensing in 2 the liquefied ammonia is passed through a throttle valve 7 into the lower pressure system where it produces refrigeration in refrigerator 3 by being allowed to evaporate.

The evaporated ammonia is absorbed in a scrubbing tower 5 and the solution of ammonia of the desired strength is returned to the chemical vessels to be again reacted on, producing more fixed ammonia, thus completing the cycle.

In such a system as this, additional new ammonia will have to be added at some point, possibly directly to vessels 4 in order to make up for the quantities used up in the major reaction or lost mechanically or as other by-products. In this case the fixed ammonia recovered is one of the by-products formed.

In Fig. 3 is shown a process for effecting a use of heat otherwise wasted in the concentration of weak liquors of aqueous ammonia. The principle of operation is similar to that of the previously described systems.

Weak ammonia liquor from chemical or other reaction vessels 4 is fed into a feed tank 10. Part of the weak liquor is fed therefrom through a pump 6 into a regenerator 1. The pump 6 may be omitted if a pump 1^A is used and gravity flow resorted to for the concentrated liquor. Vapors issuing from regenerator 1 under suitable pressure are cooled and liquefied in condensor 2 and passed into refrigerator 3, which is maintained under low pressure where the liquid evaporates causing refrigeration. The pump 1^A may be used to advantage in order to permit of low pressure operation in regenerator 1. Great heat economy is obtained by making pump 1^A a steam driven unit exhausting into the generator coils. The vapors from refrigerator 3 pass into an absorption unit 5 into which weak liquor is fed from the tank 10 and brought up to any desired strength, discharging into the reaction units 4 in which is performed the chemical or other reaction using the strong aqueous ammonia.

A slight back pressure on units 3 and 5 will permit of the production of aqua ammonia of very high strength.

In this manner the heat energy of distillation of the ammonia is converted into useful energy as a refrigerant instead of being wasted as is done in present plant operation.

The regenerator 1 in addition to having the usual dephlegmators and columns may be assisted in dehydrating the ammonia vapors by passage through a drying unit 12 which may contain a dehydrating unit such as lime.

The free ammonia is released from the chemical reaction vessels at relatively low pressure, and my invention involves the application to this ammonia of higher pressures and the liquefaction thereof by the aid of cooling water. The ammonia may then be expanded and vaporized in the production of a refrigerating effect. A relatively small quantity of energy thus expended in the creation of higher pressure results in the utilization of a large amount of energy otherwise wasted. Concentration and purification of ammonia occurring in or contaminated with aqueous or other solutions or mixtures are normally carried out at atmospheric pressure. My invention insures the utilization of the energy spent in vaporization and otherwise wasted, at small cost, and by the development of pressures suitable to liquefaction by ordinary cooling means.

The foregoing is descriptive of some of the possible applications of my process of converting wasted into useful energy, but I do not limit any claims to the example cited.

I claim:

1. The process of utilizing ammonia resulting from a chemical reaction in which free ammonia is released at low pressure, comprising absorbing the ammonia released in water or suitable solvent, heating the solution formed and thus driving off ammonia vapors, cooling the vapors at high pressure thus formed under pressure sufficiently to liquefy the ammonia, passing the liquid ammonia into a system of lower pressure and allowing it to evaporate, thus causing a refrigerating effect, and subsequently using the ammonia in the chemical reaction.

2. A process comprising a chemical reaction in which ammonia is used and given off at low temperature, raising the pressure of and cooling said ammonia to liquefy same, passing the liquid ammonia into a system of lower pressure, allowing the ammonia to evaporate therein thus causing a refrigerating effect, recovering the ammonia, and using the same in the chemical reaction again.

3. A process comprising a chemical reaction in which ammonia in solution is used and fixed ammonia is produced at low pressure, which consists in adding a suitable reagent to said fixed ammonia to free the ammonia, adding sufficient heat to the mixture to drive off the ammonia at a high pressure, cooling and liquefying the ammonia, evaporating said liquid ammonia at a lower pressure, absorbing in a suitable liquid the vapor from said evaporating liquid and again utilizing the ammonia in solution thus formed in said chemical reaction.

4. A process comprising a chemical reaction in which ammonia is used and is given off at low pressure, raising the pressure of and cooling said ammonia to liquefy same, passing the liquid ammonia into a system of lower pressure, allowing the ammonia to evaporate therein thus causing a refrigerating effect, recovering the ammonia, and using the same in the chemical reaction again.

5. A process comprising a chemical reaction in which ammonia is used and fixed ammonia is produced, transferring the same to a regenerator and heating the same therein with the addition of a reagent to generate ammonia, liquefying the same at high pressure in a condenser, expanding the same in a refrigerator, and subsequently reusing the same in the chemical reaction.

6. A process comprising using ammonia in a chemical reaction producing an ammoniacal by-product, regenerating said by-product, liquefying the ammonia by cooling under increased pressure, expanding the same in a system of lower pressure, thus producing a refrigerating effect, and subsequently using the ammonia in the reaction again.

7. A process comprising a chemical reaction in which ammonia is used and given off in one stage, regenerating the ammonia in another stage, increasing the pressure of the regenerated ammonia, liquefying the same by cooling, passing the liquid into a system of lower pressure, evaporating the ammonia thus causing a refrigerating effect, and subsequently reusing the ammonia in the chemical reaction.

In testimony whereof, I affix my signature in presence of two witnesses.

JUSTIN F. WAIT.

Witnesses:
 HOWARD G. WILSON,
 JOHN C. WAIT.